United States Patent [19]

Kawai et al.

[11] Patent Number: 5,148,312
[45] Date of Patent: Sep. 15, 1992

[54] CLEANING APPARATUS FOR REMOVING FOREIGN SUBSTANCES FROM A SURFACE VARIOUSLY INCLUDING A CURVED MEMBER, EXPANDING-CONTRACTING VIBRATOR MEANS, AND SPACER MEANS INCLUDING A THROUGH HOLE OR A DEPRESSED REGION

[75] Inventors: Taneichi Kawai, Anjo; Naofumi Fujie, Nagoya; Tomoaki Imaizumi, Aichi; Koji Ito, Kariya, all of Japan

[73] Assignee: Aisin Seiki Kabushiki Kaisha, Kariya, Japan

[21] Appl. No.: 475,981

[22] Filed: Feb. 6, 1990

[30] Foreign Application Priority Data

Feb. 9, 1989 [JP] Japan ................................. 1-32301
Feb. 10, 1989 [JP] Japan ................................. 1-32063
Mar. 17, 1989 [JP] Japan ................................. 1-67170

[51] Int. Cl.⁵ .......................... B60R 1/06; G02B 7/182
[52] U.S. Cl. ............................................... 359/507
[58] Field of Search ......................... 350/582–584, 350/588, 608; 15/250 B, 250 R; 219/219; 310/321–324; 359/507–512

[56] References Cited

U.S. PATENT DOCUMENTS

| | | | |
|---|---|---|---|
| 3,180,626 | 4/1965 | Mettler | 350/582 |
| 4,387,973 | 6/1983 | Martin | 350/582 |
| 4,768,256 | 9/1988 | Motoda | 310/323 |
| 4,833,373 | 5/1989 | Doi et al. | 350/582 |
| 4,929,072 | 5/1990 | Fujie et al. | 350/582 |
| 5,012,593 | 5/1991 | Okada et al. | 15/250 B |
| 5,013,888 | 5/1991 | Okada et al. | 219/219 |

FOREIGN PATENT DOCUMENTS

| | | | |
|---|---|---|---|
| 1412224 | 8/1965 | France | 15/250 |
| 59-8548 | 1/1984 | Japan | 350/582 |
| 59-40145 | 3/1984 | Japan . | |
| 61-30552 | 2/1986 | Japan . | |
| 150201 | 7/1987 | Japan | 350/582 |
| 62-238149 | 10/1987 | Japan . | |
| 62-191550 | 12/1987 | Japan . | |

Primary Examiner—Jon W. Henry
Attorney, Agent, or Firm—Burns, Doane, Swecker & Mathis

[57] ABSTRACT

The cleaning apparatus for removing foreign substances includes a spacer which is interconnected between a generally planar member and a vibrator, wherein the spacer provides a space for separating the generally planar member from the vibrator. The spacer allows the generally planar member to bend easily. Thus, a large amplitude of vibration can be obtained on the whole of the generally planar member.

18 Claims, 22 Drawing Sheets

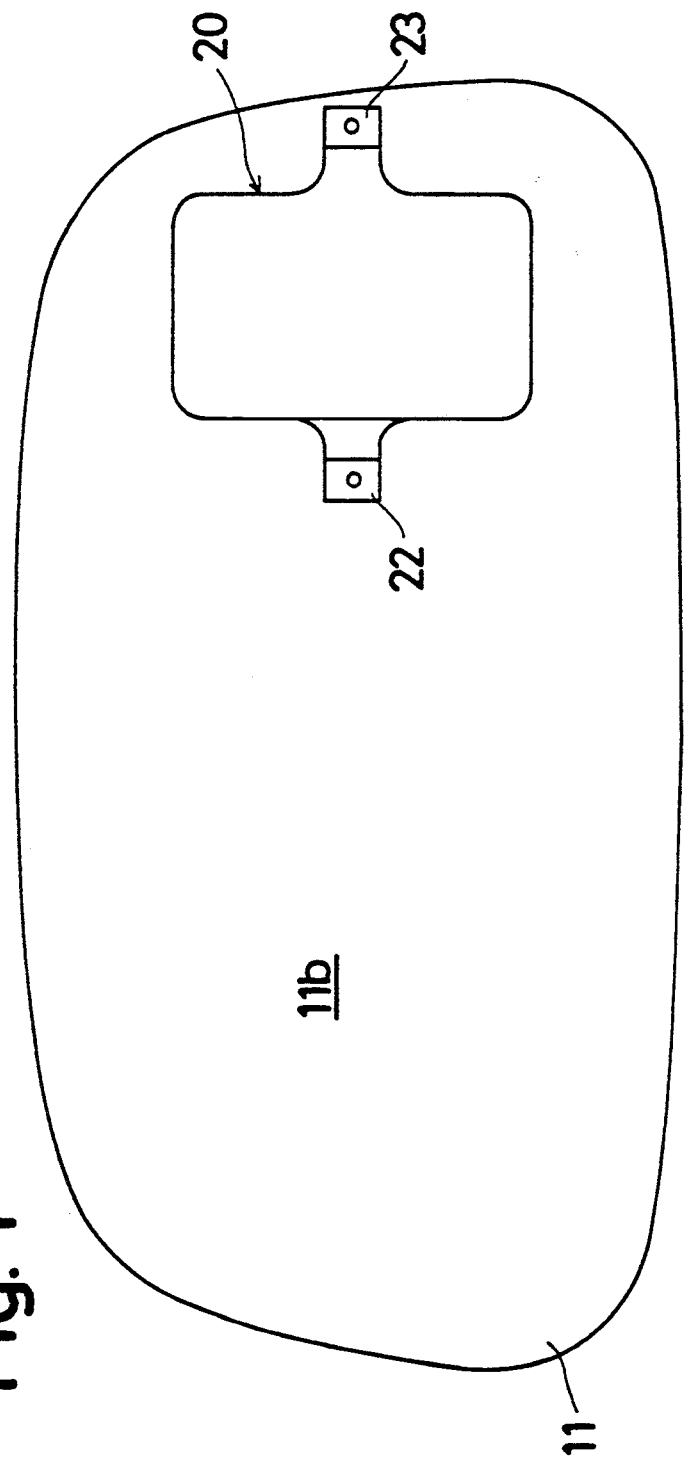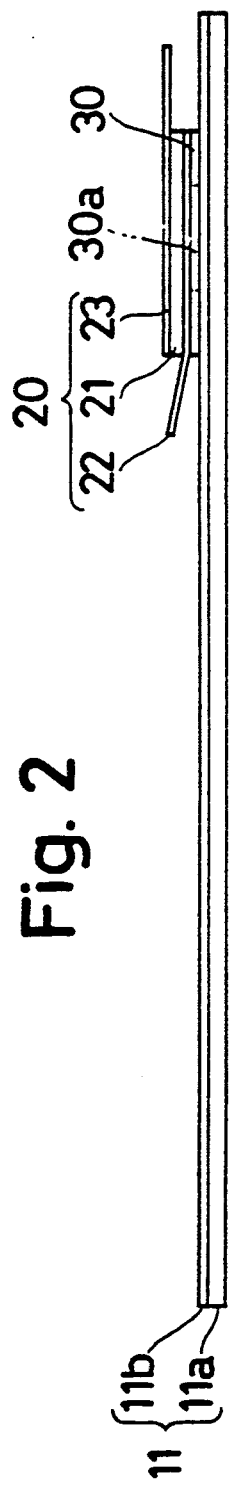

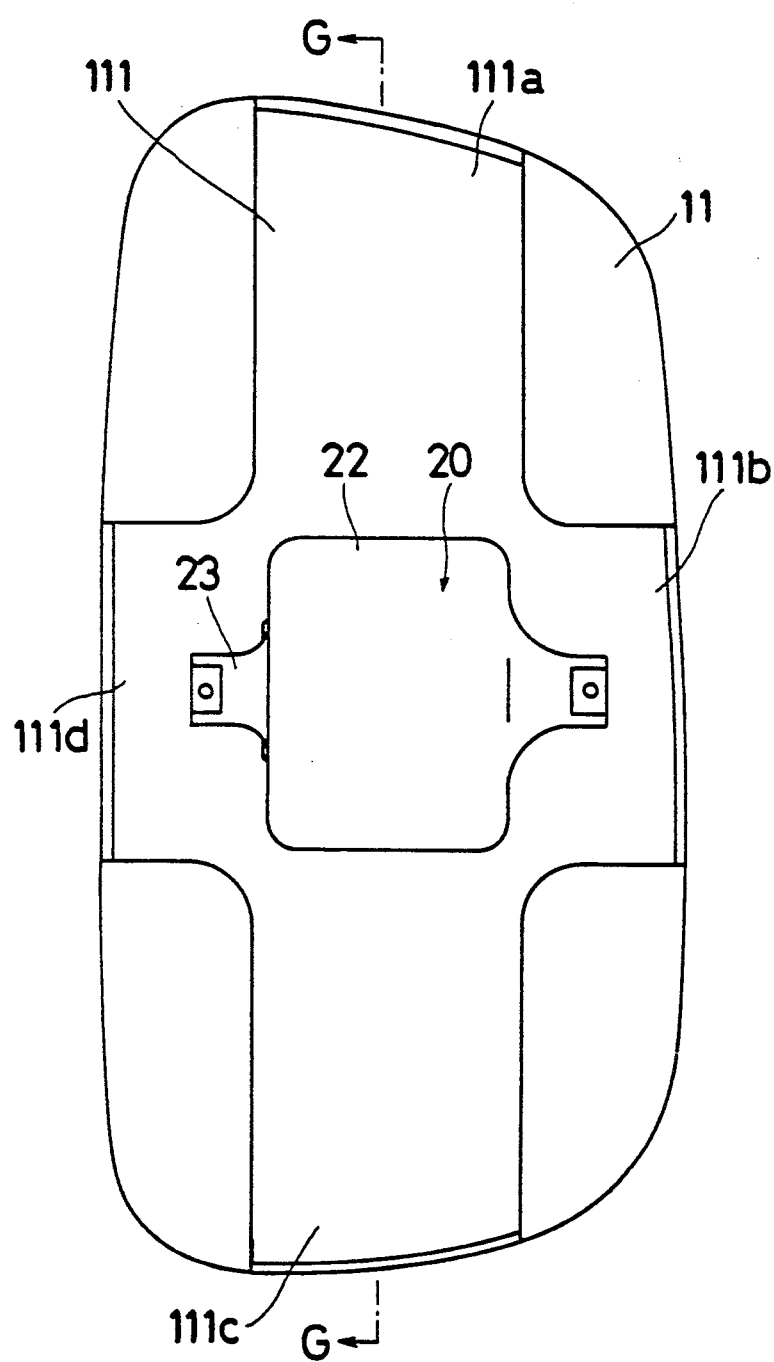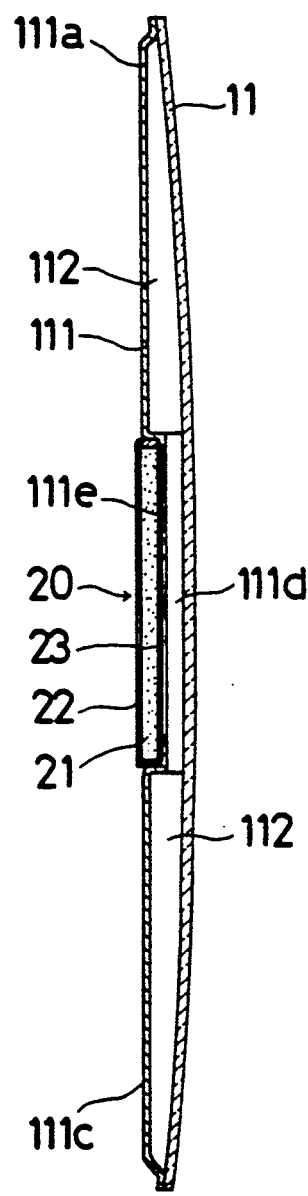

Fig. 38
Fig. 39
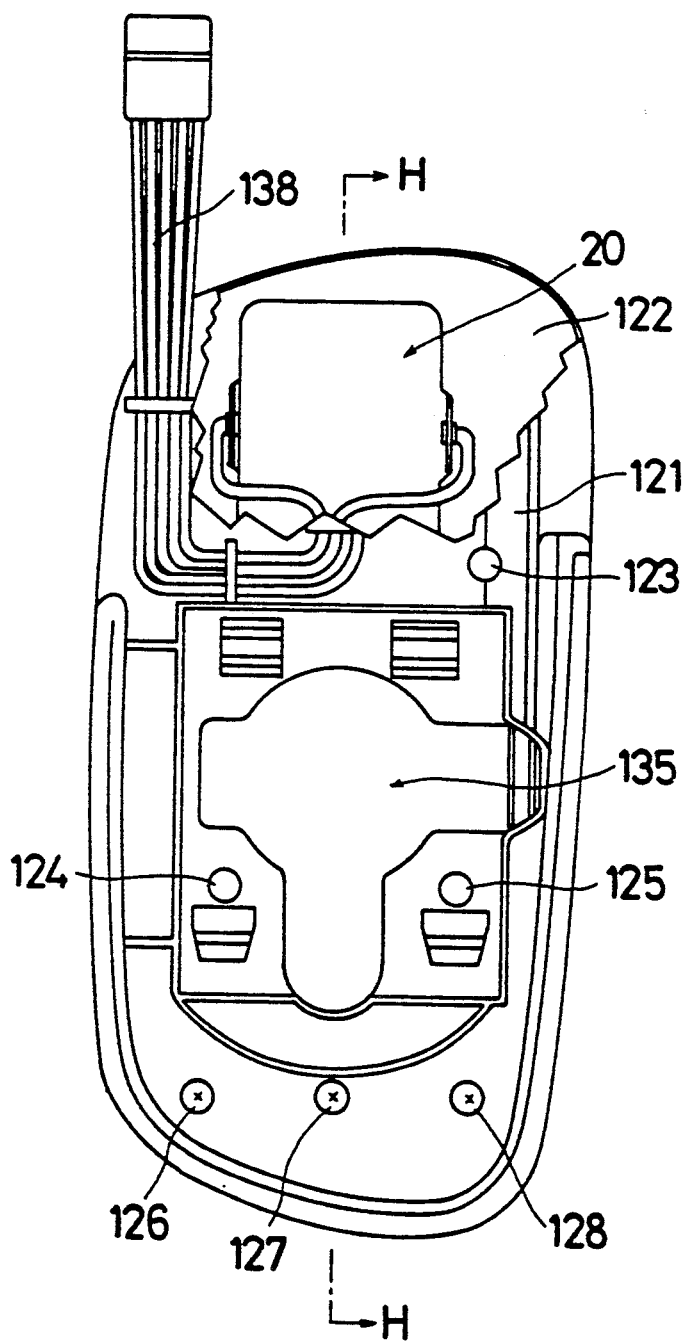
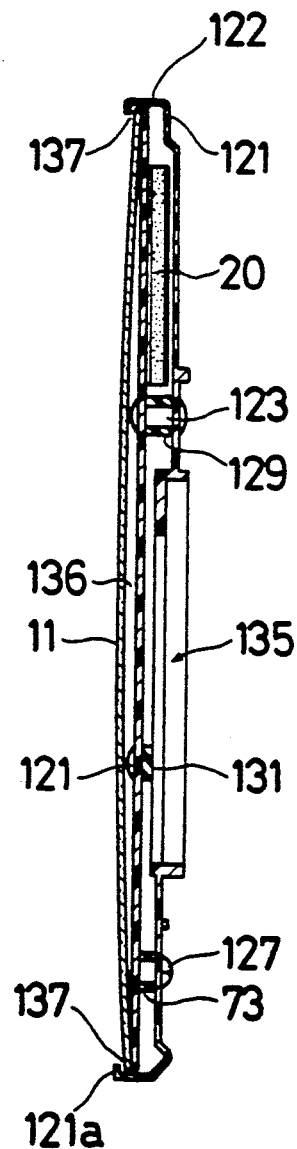

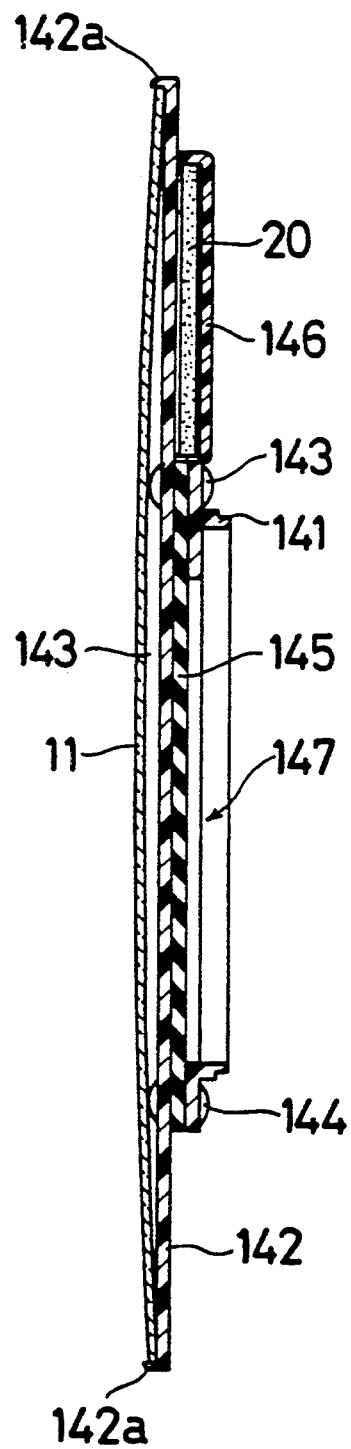
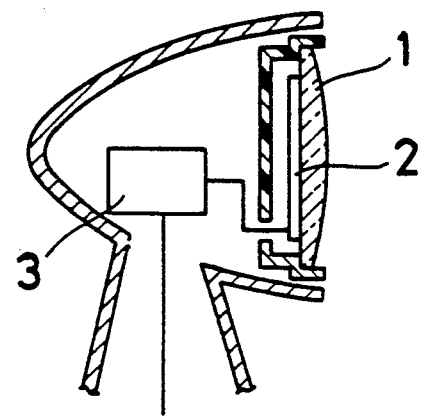
Fig. 40
Fig. 41

CLEANING APPARATUS FOR REMOVING FOREIGN SUBSTANCES FROM A SURFACE VARIOUSLY INCLUDING A CURVED MEMBER, EXPANDING-CONTRACTING VIBRATOR MEANS, AND SPACER MEANS INCLUDING A THROUGH HOLE OR A DEPRESSED REGION

BACKGROUND OF THE INVENTION

This invention relates to a cleaning apparatus for removing foreign substances from a plate shaped member, and more particularly, from on automotive rearview mirror.

FIG. 41 is a cross sectional view of the conventional apparatus which is disclosed in Japanese Laid-open patent No. 59-8548, published on Jan. 17, 1984. This conventional apparatus comprises a planar member (1), a vibrator (2) for oscillating the planer member (1) and an oscillating circuit (3) for supplying A.C. signals to the vibrator (2). When the planar member (1) is oscillated, foreign substances are atomized away and are removed from the planar member (1).

As clearly shown in FIG. 41, the vibrator (2) is adhered to the planar member (1) directly. Further, the vibrator (2) has almost the same size as the planar member (1).

However, if the vibrator (2) is adhered to the planar memebr (1) directly, the planar member (1) becomes hard to bend due to the increased thickness. Accordingly, the amplitude of the vibration which is generated on the planar member (1) tends to be small, if the planar member (1) becomes hard to bend. Thus, the conventional apparatus requires much time and/or much electric power for removing the foreign substances from the planar member (1).

SUMMARY OF THE INVENTION

Accordingly, one of the objects of this invention is to obviate the above conventional drawbacks.

It is also an object of this invention to remove foreign substances from a planar member immediately.

It is the other objects of this invention to reduce the electric power required for removing foreign substances.

Further, it is also an object of this invention to bend a planar member easily.

Furthermore, it is also an object of this invention to oscillate a planar member with large amplitude.

To achieve the above objects, and in accordance with the principles of the invention as embodied and broadly described herein, the cleaning apparatus for removing foreign substances includes a spacer which is interconnected between a generally planar, member and a vibrator, wherein the spacer provides a space for separating the planar member from the vibrator.

BRIEF DESCRIPTION OF THE DRAWINGS

The accompanying drawings, which are incorporated in and constiutute a part of the specification, illustrate an embodiment of the invention, and, together with the description, serve to explain the principles of the invention. Of the drawings:

FIG. 1 is a plane view of an automotive rear view mirror relating to the present invention.

FIG. 2 is a side view of an automotive rear view mirror relating to the present invention.

FIG. 36 is a plane view of an automotive rear view mirror relating to the present invention.

FIG. 37 is a cross sectional view along line G—G in FIG. 36.

FIG. 38 is a plane view of an automotive rear view mirror relating to the present invention.

FIG. 39 is a cross sectional view along line H—H in FIG. 38.

FIG. 40 is a cross sectional view relating to the present invention.

FIG. 41 is a cross sectional view of the conventional apparatus.

BRIEF DESCRIPTION OF THE PREFERRED EMBODIMENTS

Reference will now be made in detail to the present preferred embodiment of this invention, an example of which is illustrated in the accompanying drawings.

Figure 3:
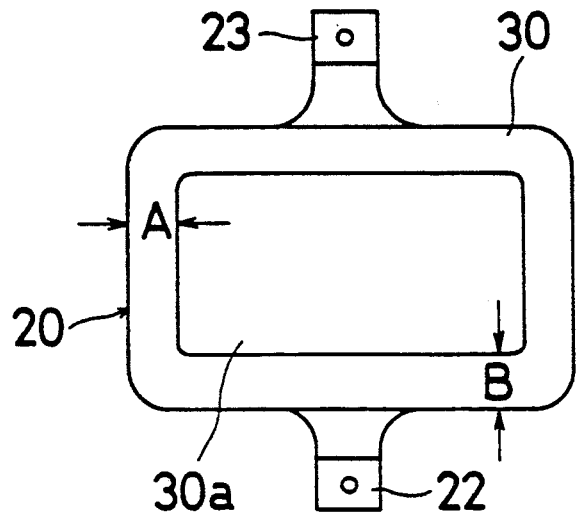
FIG. 3 is a bottom view of a vibrator showing a shape of a spacer relating to the present invention.

Referring to FIGS. 1, 2 and 3, the first embodiment of this invention will be explained.

A mirror (11) formed as a generally planar member comprises a transparent glass plate (11a) and a reflecting layer (11b). A spacer means (30) which has a depressed portion (30a) is adhered to the reflecting layer (11b). The depressed portion (30a) is located on or almost on center of the spacer (30). The spacer (30) is made of glass-epoxy plate.

The depressed portion (30a) is a portion where a vibrator (20) is separated from the reflecting layer (11b). Widths (A) and (B) are chosen to be shorter than a wave length of the vibration wave generated on the mirror (11). Therefore, the vibration which is generated on the mirror (11) can be conducted to the depressed portion (30a) across the spacer (30).

The piezoelectric vibrator (20) is adhered to the spacer (30). The piezoelectric vibrator means (20) also includes a pair of electrodes (22) and (23) which are adhered to opposite ends of the piezoelectric element (21). The electrodes are made of a flexible printed circuit board. The piezoelectric element (21) is made from a piezoelectric ceramic. An oscillating circuit (40) which acts as a means for vibrating the vibrator (20), is connected between the electrodes (22) and (23) electrically.

The piezoelectric vibrator (20) expands and contracts toward a thickness direction (i.e. up and down direction in FIG. 2) and toward a radial direction (i.e. right and left direction in FIG. 2), while electric power is supplied to the electrodes (22) and (23).

Figure 4A:
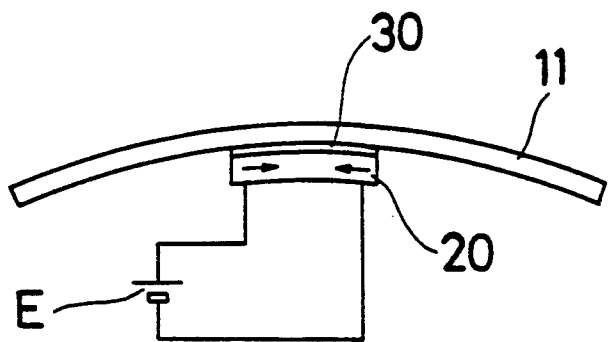
FIGS. 4a, 4b and 4c illustrate an oscillation of a mirror relating to the present invention.
Figure 4B:
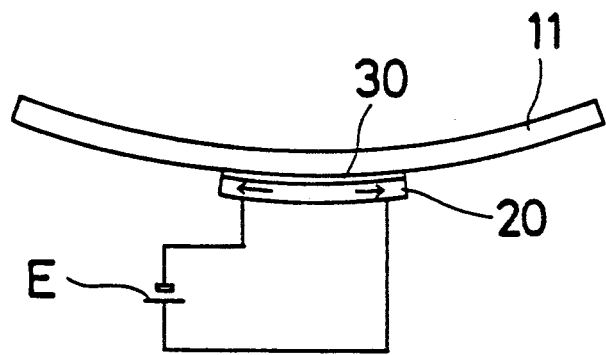
Figure 4C:
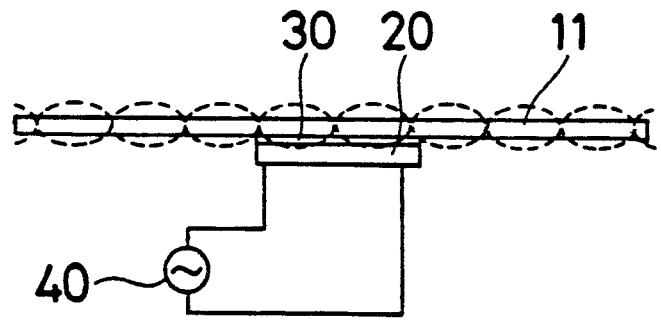

Referring now to FIGS. 4a, 4b and 4c, an oscillation of the mirror (11) will be explained.

As shown in FIG. 4a, when the electrode (22) is connected to the plus terminal of the D.C. power supply (E) and the electrode (23) is connected to the minus terminal of D.C. power supply (E), the piezoelectric vibrator (20) is mainly contracted toward the radial direction. At this time, the mirror (11) is bent due to the strong contracting force generated by the piezoelectric vibrator (20).

As shown in FIG. 4b, when the electrode (22) is connected to the minus terminal of the D.C. power supply (E) and the electrode (23) is connected to the plus terminal of D.C. power supply (E), the piezoelectric vibrator (20) is mainly expanded toward the radial direction. At this time, the mirror (11) is bent reversely due to strong expanding force generated by the piezoelectric vibrator (20).

As shown in FIG. 4c, when the electrodes (22) and (23) are connected to the oscillating circuit (40), the mirror (11) is bent reversely and repeatedly. As long as the frequency of the oscillating circuit (40) is determined properly, the mirror (11) may be resonated and a standing wave may be generated on the mirror (11). When the mirror (11) is resonated, water droplets and the other foreign substances are atomized and drop off the mirror (11).

In the first embodiment, the depressed portion (30a) is provided on or almost on the center of the spacer (30). The depressed portion (30a) makes the mirror (11) bend easily compared to the mirror to which the vibrator (20) is directly adhered. Accordingly, the vibration can be propagated to the whole of the mirror (11) without interference of the piezoelectric vibrator (20).

In the first embodiment, the depressed portion (30a) is provided on or almost on the center of the spacer (30). However, many modification can be obtained.

Figure 5:
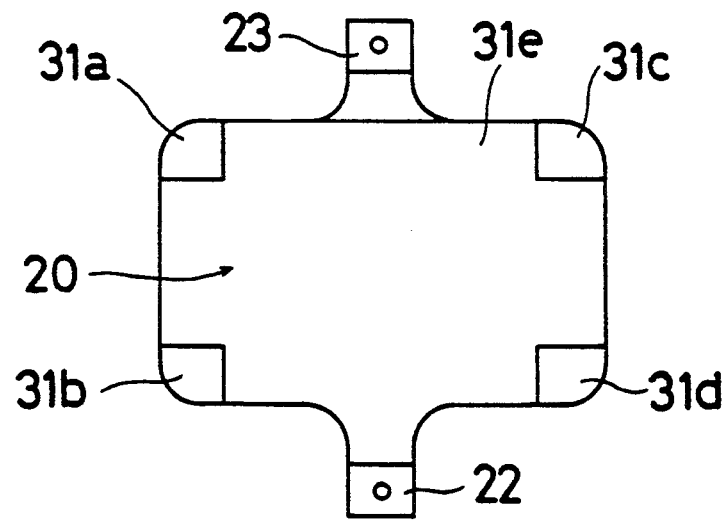
FIGS. 5, 6 and 7 are bottom views of a vibrator showing a shape of a spacer relating to the present invention.

For example, as shown in FIG. 5, the spacer can be divided into four parts (31a), (31b), (31c) and (31d). Each part is adhered to each corner of the piezoelectric vibrators (20). In this type of embodiment, a portion (31e) becomes a separation corresponding to the depressed portion (30a).

Figure 6:
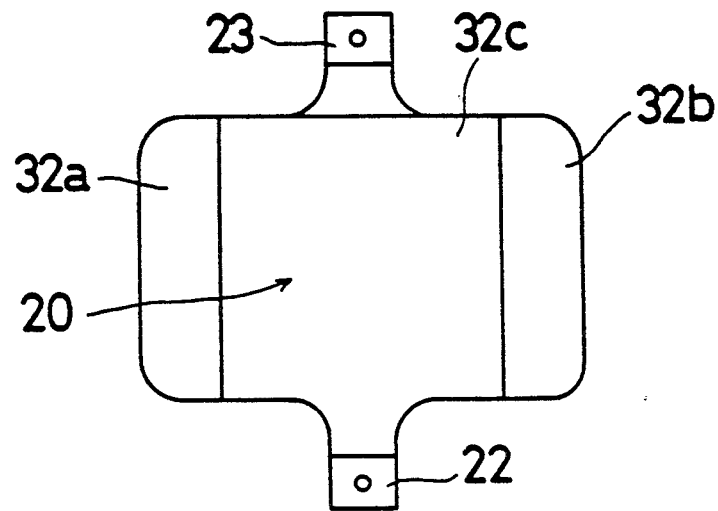

Further, as shown in FIG. 6, the spacer is divided into two parts (32a) and (32b). The parts (32a) and (32b) are adhered to the piezoelectric vibrator (20) along short sides of the vibrator (20). In this embodiment, the portion (32c) becomes a separation corresponding to the depressed portion (30a).

Figure 7:
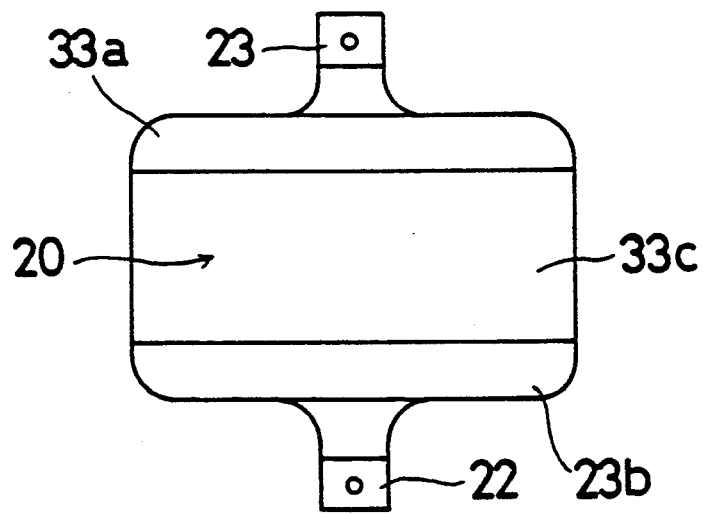

Furthermore, as shown in FIG. 7, the spacer is divided into two parts (33a) and (33b). The parts (33a) and (33b) are adhered to the piezoelectric vibrator (20) along long sides of the vibrator (20). In this embodiment, the portion (33c) becomes a separation corresponding to the depressed portion (30a).

Figure 11A:
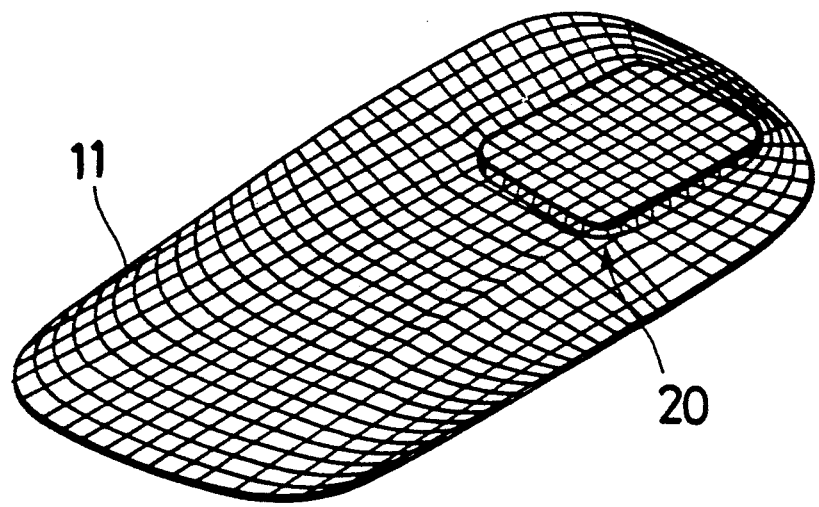
FIGS. 11a and 11b are perspective views showing vibration conditions of the mirror using a conventional vibrator.
Figure 11B:
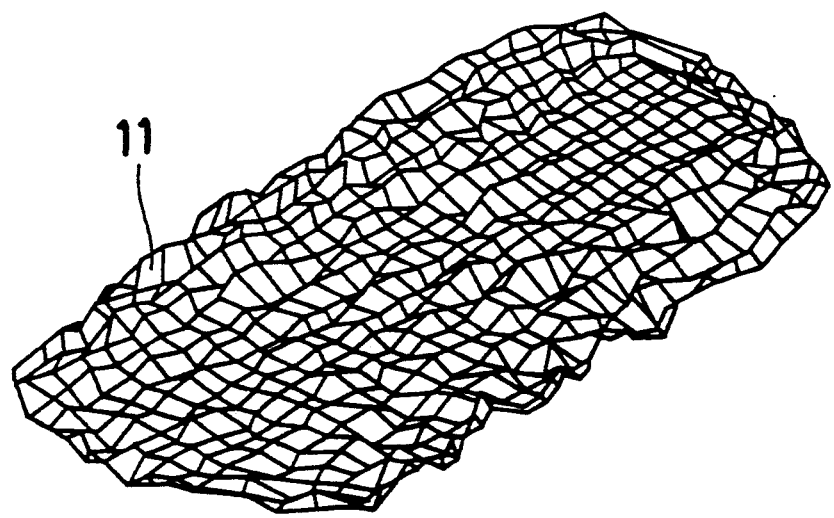

Amplitudes of the vibrations were analyzed by FEM (Finite Element Method) analysis with computer simulation as to the above embodiments shown in FIGS. 3, 5 and 7. Further, FIGS. 11a and 11b show results of the FEM analysis relating to a conventional apparatus in order to clarify advantages of this invention.

Figure 8A:
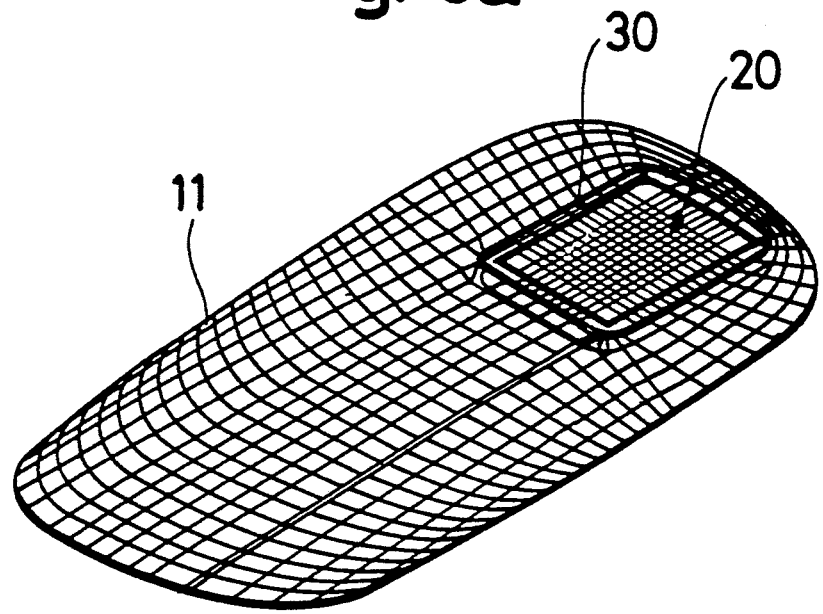
FIGS. 8a and 8b are perspective views showing vibration conditions of the mirror using a vibrator in FIG. 3.
Figure 8B:
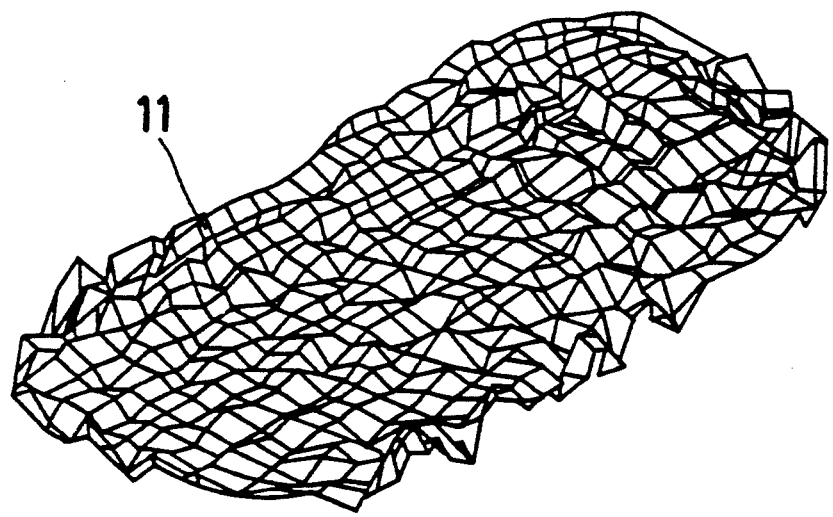

FIGS. 8a and 8b show results relating to the embodiment shown in FIG. 3. As clearly shown in FIG. 8b, vibration which has a large amplitude is generated on the entire mirror (11). The large amplitude is observed on the portion where the piezoelectric vibrator (20) is adhered.

Figure 9A:
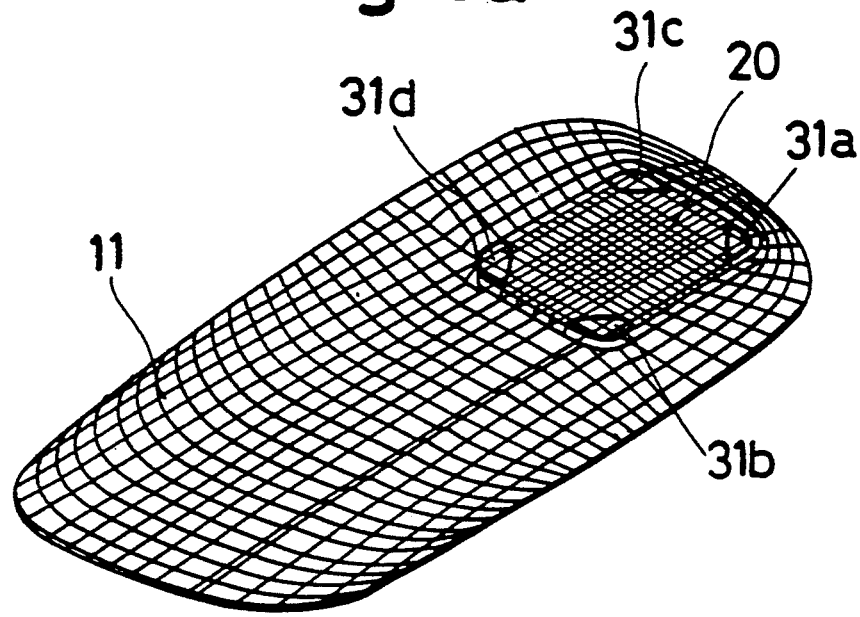
FIGS. 9a and 9b are perspective views showing vibration conditions of the mirror using a vibrator in FIG. 5.
Figure 9B:
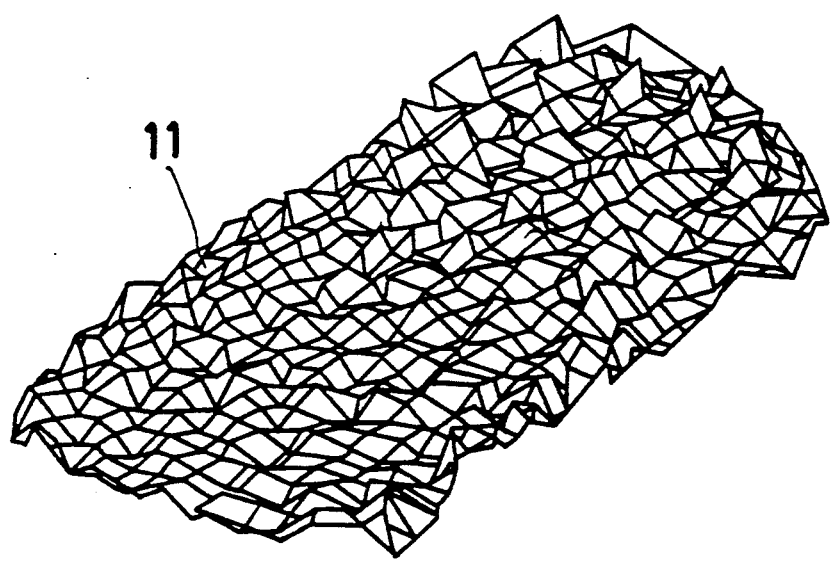

FIGS. 9a and 9b show results relating to the embodiment shown in FIG. 5. Similar to FIG. 8b, a vibration which has a large amplitude is generated on the entire mirror (11).

Figure 10A:
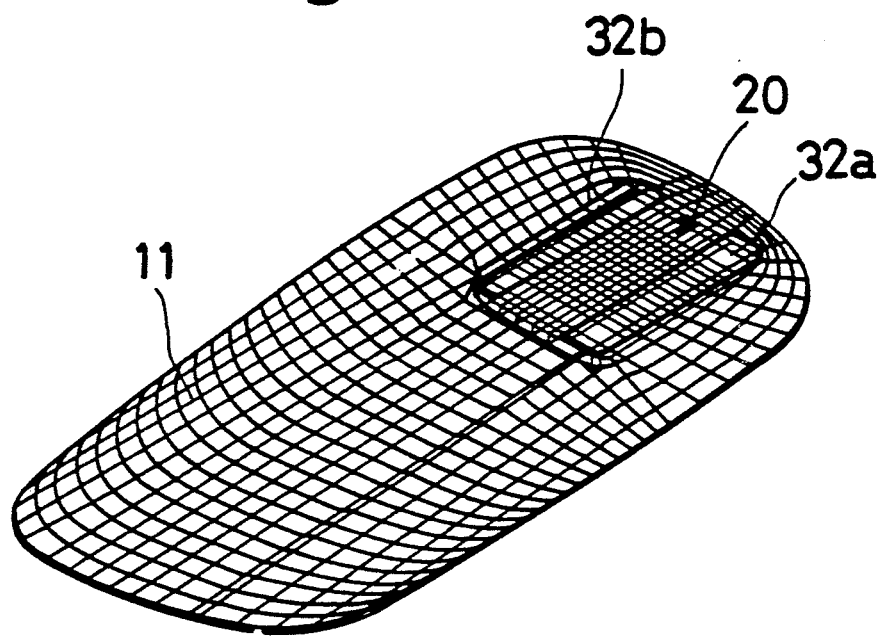
FIGS. 10a and 10b are perspective views showing vibration conditions of the mirror using a vibrator in FIG. 6.
Figure 10B:
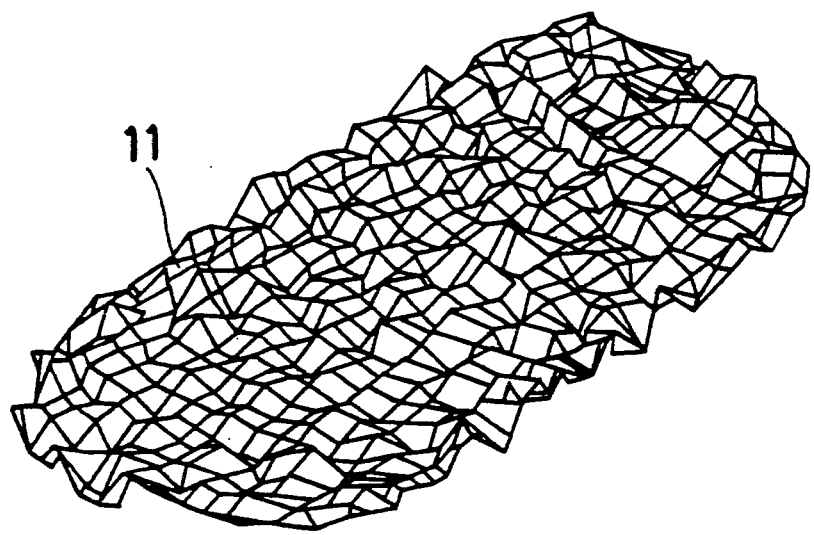

FIGS. 10a and 10b show results relating to the embodiment shown in FIG. 5. Similar to FIG. 8b, a vibration which has a large amplitude is generated on the entire mirror (11).

Contrary to the above embodiments, FIGS. 11a and 11b show results relating to a conventional apparatus. As shown in FIG. 11b, the vibration of the mirror (11) is weakened by the interference of the piezoelectric vibrator (20). Therefore, the amplitude of the vibration becomes small on the portion where the piezoelectric vibrator (20) is adhered. Thus, the water droplets and/or the other foreign substances can remain at the portion where the piezoelectric vibrator (20) is adhered.

Figure 12:
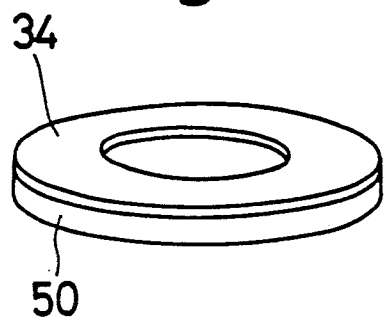
FIGS. 12 and 13 are perspective views showing modified vibrators relating to the present invention.
Figure 13:
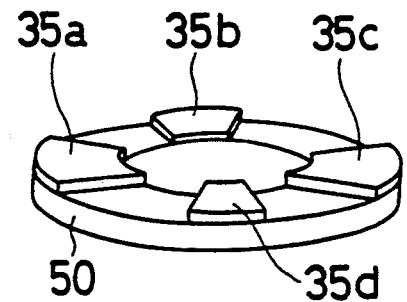

In the above embodiments, the vibrator (20) has a rectangular shape. However, the vibrator need not have a rectangular shape. FIGS. 12 and 13 show a disc-shaped vibrator (50). The disc-shaped vibrator (50) can also be utilized instead of the rectangular-shaped vibrator (20). In FIG. 12, a doughnut-shaped spacer (34) is adhered to the disc-shaped vibrator (50). In FIG. 13, sector-shaped spacers (35a), (35b), (35c) and (35d) are adhered to the disc-shaped vibrator (50). Both types of spacers (34), (35a), (35b), (35c) and (35d) can remove the water droplets and/or the other foreign substances from the mirror (11) as well as the rectangular-shaped vibrator (20).

Figure 14:
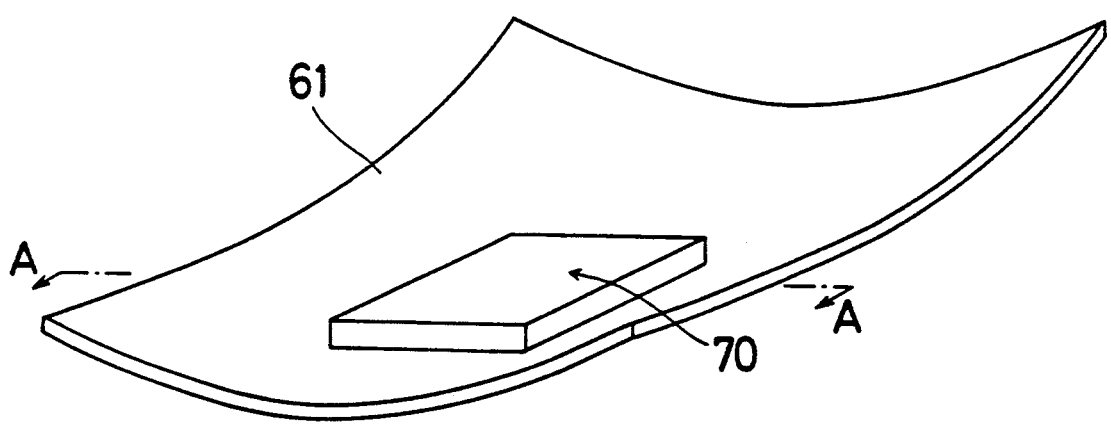
FIG. 14 is a perspective view showing another embodiment of the present invention.
Figure 15:
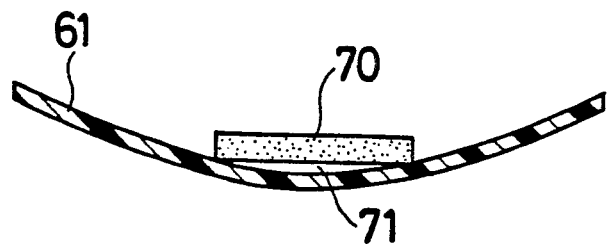
FIG. 15 is a cross sectional view along line A—A in FIG. 14.

Referring now to FIGS. 14 and 15, the second embodiment of this invention will be explained.

The second embodiment is suitable for removing foreign substance from a curved member, such as; a mirror (61) having a large curvature. A plane piezoelectric vibrator (70) is adhered to a part of the mirror (61). Each corner of the vibrator (70) contacts the mirror (61) due to the curvature of the mirror (61), and each corner is adhered to the mirror (61).

A space (71) is formed between the vibrator (70) and the mirror (61). The space (71) becomes a separation where the mirror (61) does not have any contact with the vibrator (70). The space (71) allows the mirror (61) to bend easily. Accordingly, the vibration can be propagated to the whole of the mirror (61) without interference of the piezoelectric vibrator (70).

Figure 16:
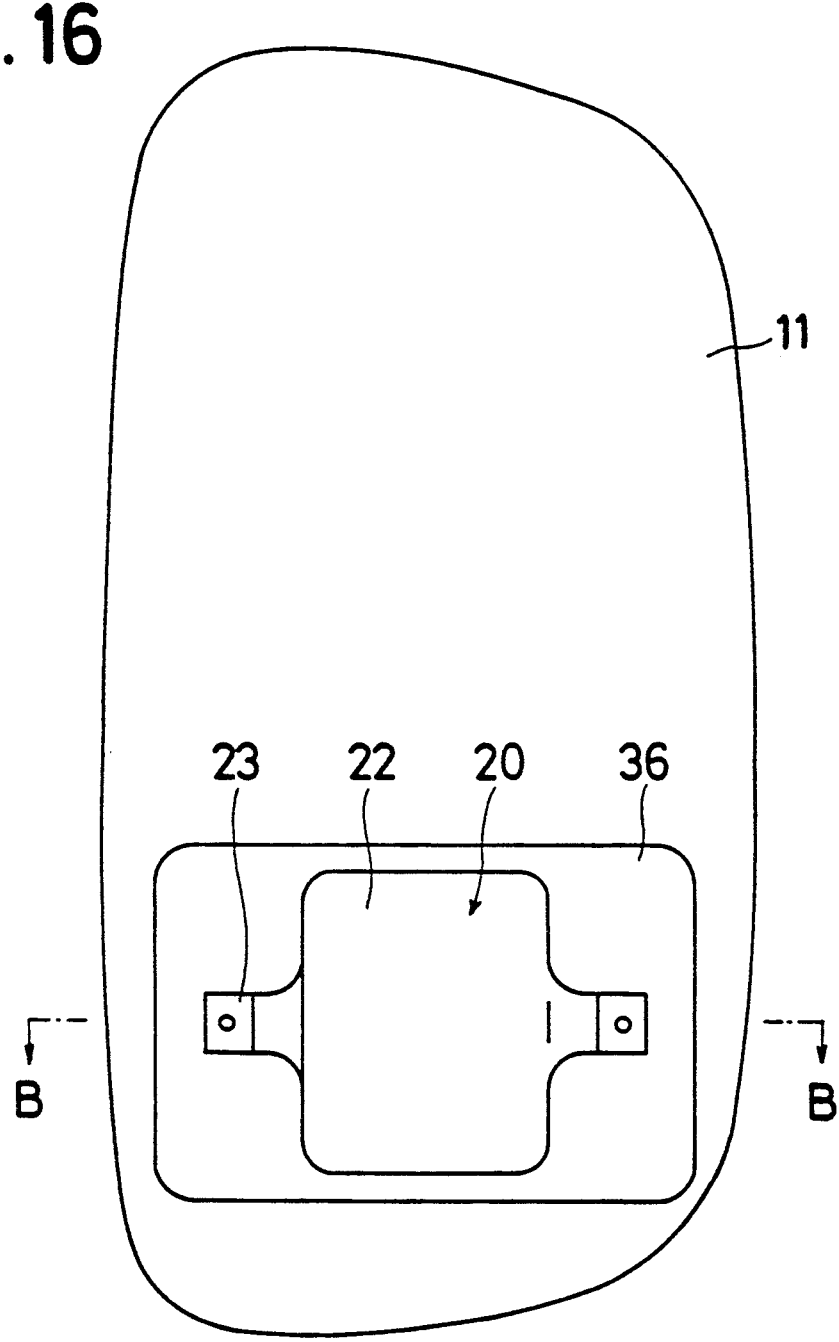
FIG. 16 is a plane view of an automotive rear view mirror relating to the present invention.
Figure 17:
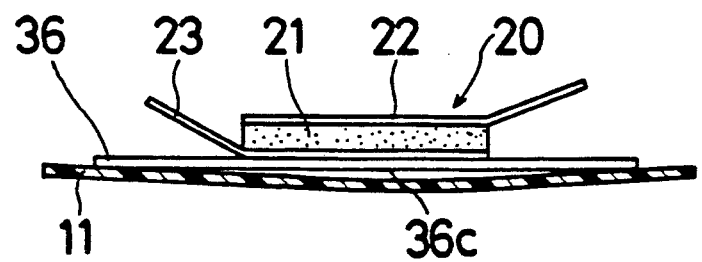
FIG. 17 is a cross sectional view along line B—B in FIG. 16.

A spacer (36) can be projected from the piezoelectric vibrator (20). FIGS. 16 and 17 show the third embodiment of this invention. Referring now to FIGS. 16 and 17, the third embodiment of this invention will be explained.

The planar spacer (36) is adhered to the mirror (11). The planar spacer (36) is made from glass epoxy plate. As shown in FIG. 17, a space (36c) is formed due to the curvature of the mirror (11). The space (36c) is a separation corresponding to the depressed portion (30a) in FIG. 1.

Figure 18A:
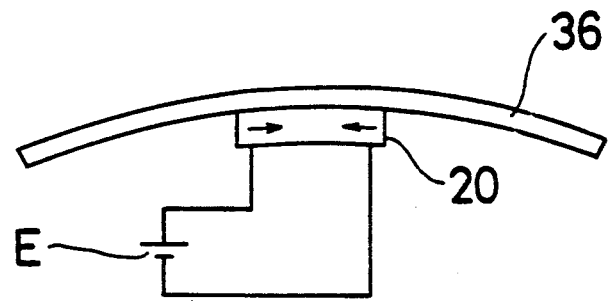
FIGS. 18a, 18b and 18c illustrate an oscillation of a mirror relating to the present invention.
Figure 18B:
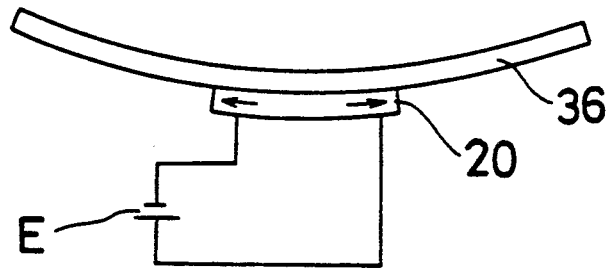
Figure 18C:
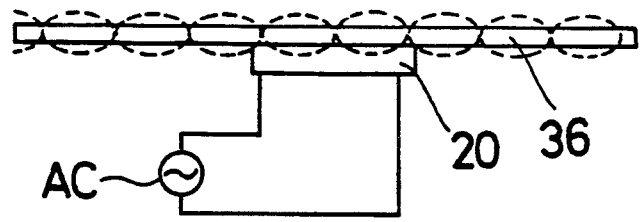

Referring now to FIGS. 18a, 18b and 18c, oscillation of the spacer (36) will be explained.

As shown in FIG. 18a, when the electrode (22) is connected to the plus terminal of the D.C. power supply (E) and the electrode (23) is connected to the minus terminal of D.C. power supply (E), the piezoelectric vibrator (20) is mainly contracted toward the radial direction. At this time, the spacer (36) is bent due to the strong contracting force which is generated by the piezoelectric vibrator (20).

As shown in FIG. 18b, when the electrode (22) is connected to the minus terminal of the D.C. power supply (E) and the electrode (23) is connected to the plus terminal of D.C. power supply (E), the piezoelectric vibrator (20) is mainly expanded toward the radial direction. At this time, the spacer (36) is bent reversely due to the strong expanding force generated by the piezoelectric vibrator (20).

As shown in FIG. 18c, when the electrodes (22) and (23) are connected to the oscillating circuit (40), the spacer (36) is bent reversely and repeatedly. Vibration of the spacer (36) is transmitted to the mirror (11), because the spacer (36) is adhered to the mirror (11).

As long as the frequency of the oscillating circuit (40) is determined properly, the mirror (11) may be resonated and a standing wave may be generated on the mirror (11). When the mirror (11) is resonated, water droplets and the other foreign substances are atomized and drop off the mirror (11).

In the third embodiment, the space (36c) is formed almost on the center of the spacer (30). The space (36c) makes the mirror (11) bend easily compared to the mirror (11) to which the vibrator (20) is directly adhered. Accordingly the vibration can be propagated to the whole of the mirror (11) without interference of the piezoelectric vibrator (20).

Figure 19:
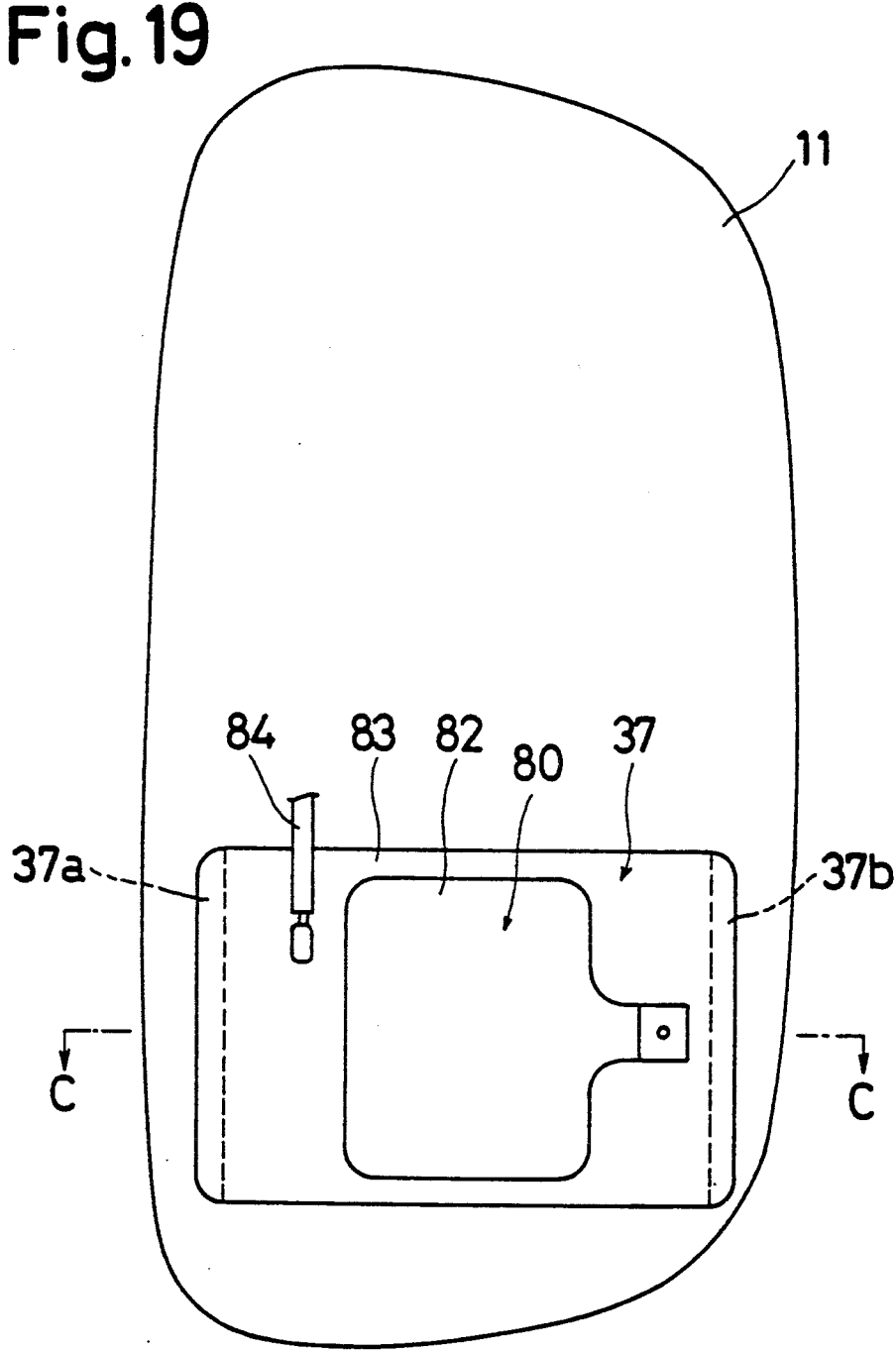
FIG. 19 is a plane view of an automotive rear view mirror relating to the present invention.
Figure 20:
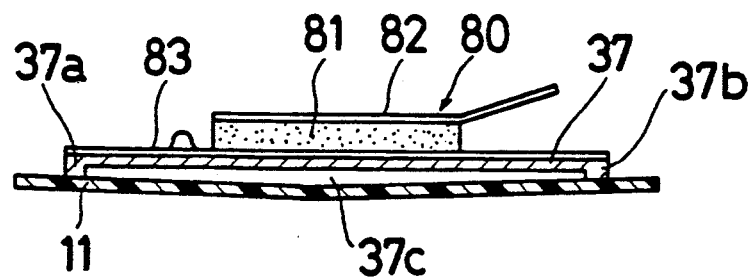
FIG. 20 is a cross sectional view along line C—C in FIG. 19.

Referring now to FIGS. 19 and 20, a modification of third embodiment will now be explained. This embodiment is the same as the third embodiment except for a shape of spacer (37).

The spacer (37) has to two liner projections (37a) and (37b). The liner projections (37a) and (37b) are formed parallel with each other. The tops of the projections (37a) and (37b) are formed parallel with each other. The tops of the projections (37a) and (37b) are adhered to the mirror (11). A space (37c) is formed between the projections (37a) and (37b). The space (37c) is a separation corresponding to the space (36c) which makes the mirror (11) bend easily.

A piezoelectric vibrator (80) is adhered to the spacer (37). The piezoelectric vibrator (80) comprises a piezoelectric element (81), an electrode (82) which is adhered to one end of the piezoelectric element (81) and the other electrode (83) which is also adhered to the spacer (37). The electrode (83) is made of phosphor-bronze plate. A conducting wire (84) is soldered to the electrode (83). Therefore, the piezoelectric vibrator (80) is oscillated when the oscillating circuit (40) is interconnected between the conducting wire (84) and the electrode (82).

Figure 21:
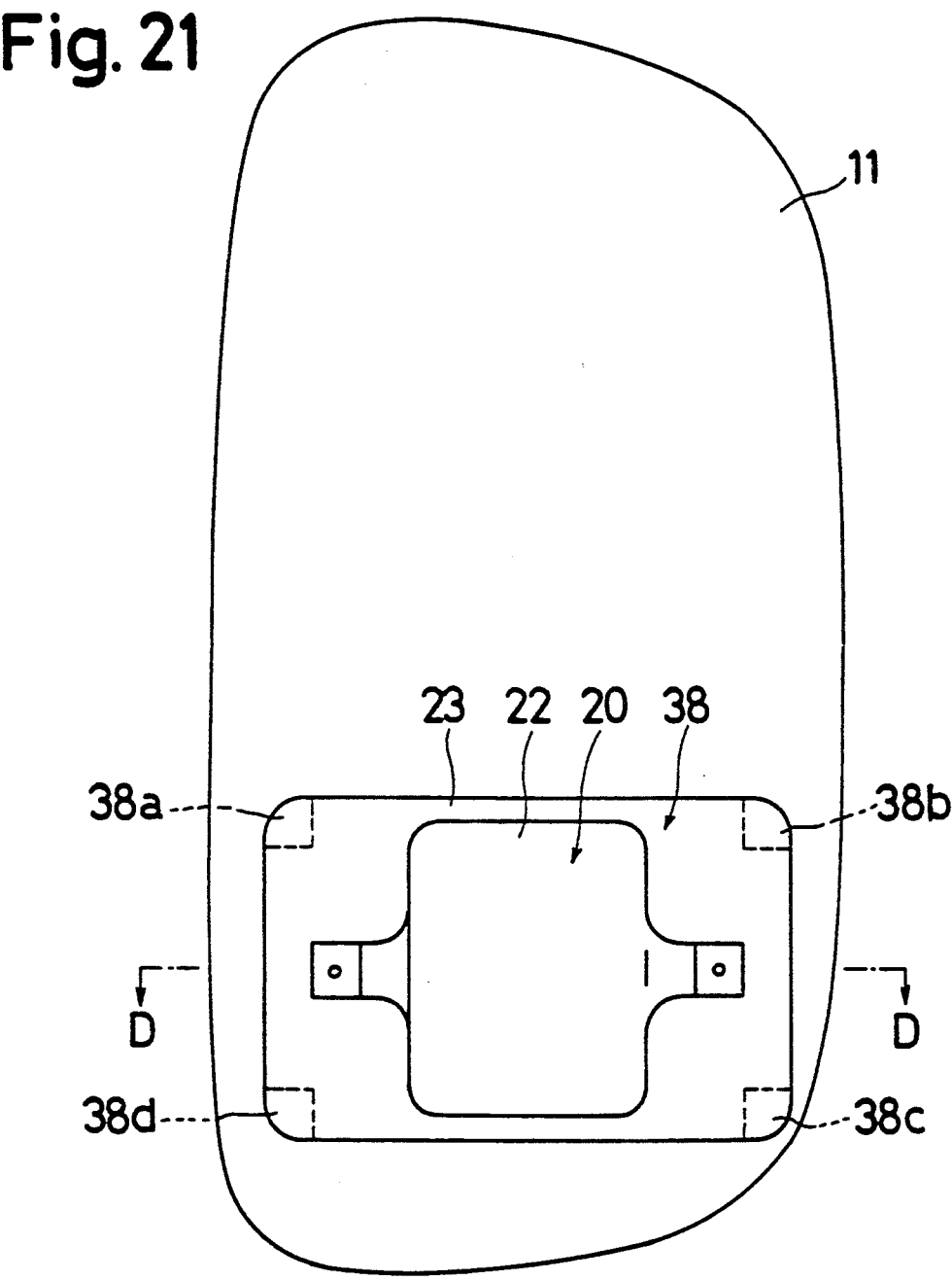
FIG. 21 is a plane view of an automotive rear view mirror relating to the present invention.
Figure 22:
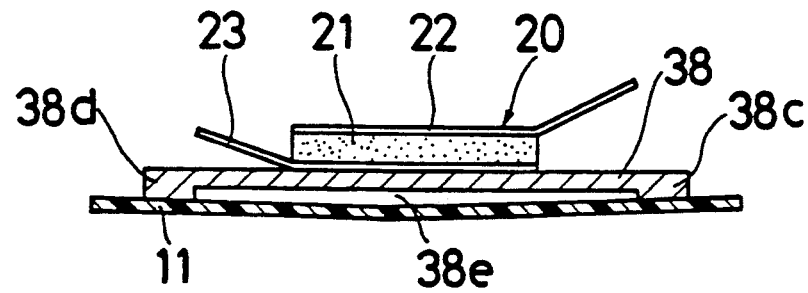
FIG. 22 is a cross sectional view along line D—D in FIG. 20.

Many modification can be obtained relating to the shape of the spacer. For example, as shown in FIGS. 21 and 22, the spacer (38) comprises four projections (38a), (38b), (38c) and (38d). The of the projections (38a), (38b), (38c) and (38d) are adhered to the mirror (11). The projections (38a), (38b), (38c) and (38d) are located on each corner of the spacer (38). A space (38e) is formed among the projections (38a), (38b), (38c) and (38d). The space (38e) is a separation corresponding to the space (36c) which makes the mirror (11) bend easily.

Figure 23:
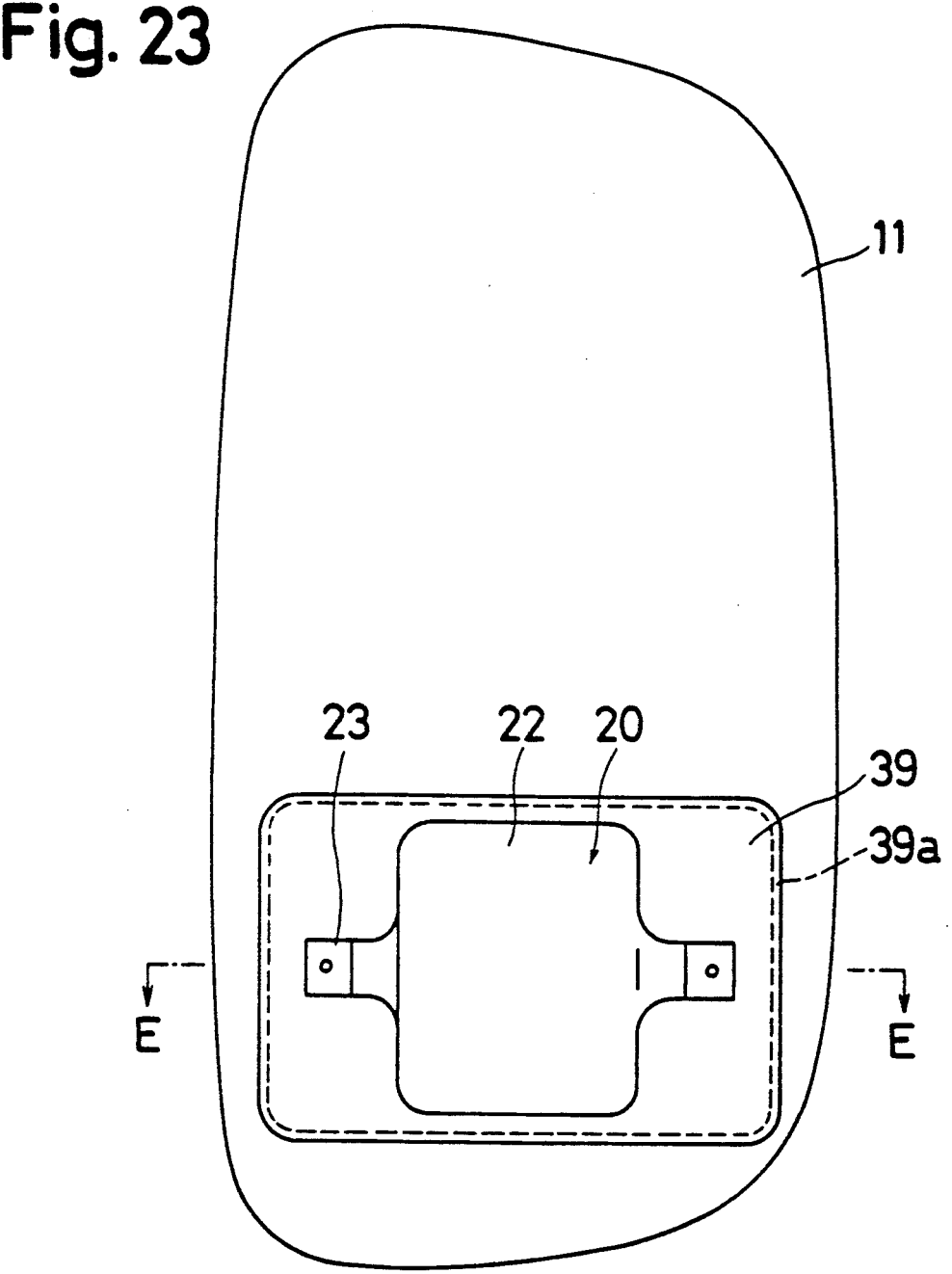
FIG. 23 is a plane view of an automotive rear view mirror relating to the present invention.
Figure 24:
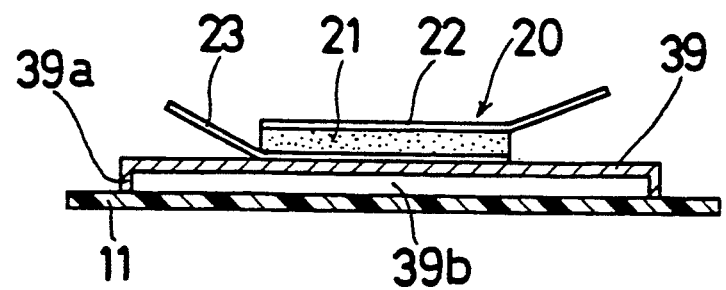
FIG. 24 is a cross sectional view along line E—E in FIG. 23.

For another example, as shown in FIGS. 23 and 24, the spacer (39) comprises a circular projection (39a) which is formed along the outer circumference of the spacer (39). A top of the circular projection (39a) is adhered to the mirror (11). A space (39b) is formed in the projection (39a). The space (39b) is a separation corresponding to the space (36c) which makes the mirror (11) bend easily.

Figure 25:
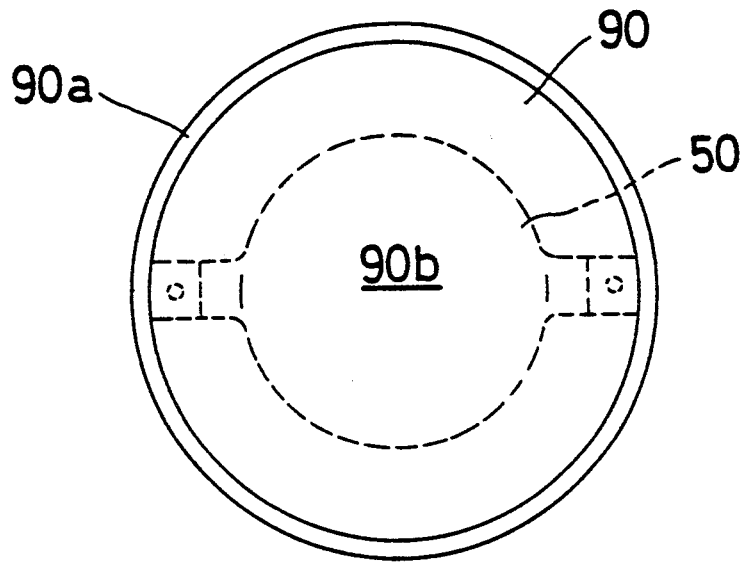
FIGS. 25 and 26 are bottom views showing the other spacer relating to the present invention.

A disc-shaped vibrator (50) can be also used to replace the rectangular-shaped vibrator (20). FIG. 25 is a bottom view of a disc-shaped spacer (90). The spacer (90) is adhered to the vibrator (50). The spacer (90) has a circular projection (90a). A top of the circular projection (90a) is adhered to the mirror (11). A space (90b) is formed in the circular projection (90a). The space (90b) is a separation corresponding to the space (36c) which makes the mirror (11) bend easily.

Figure 26:
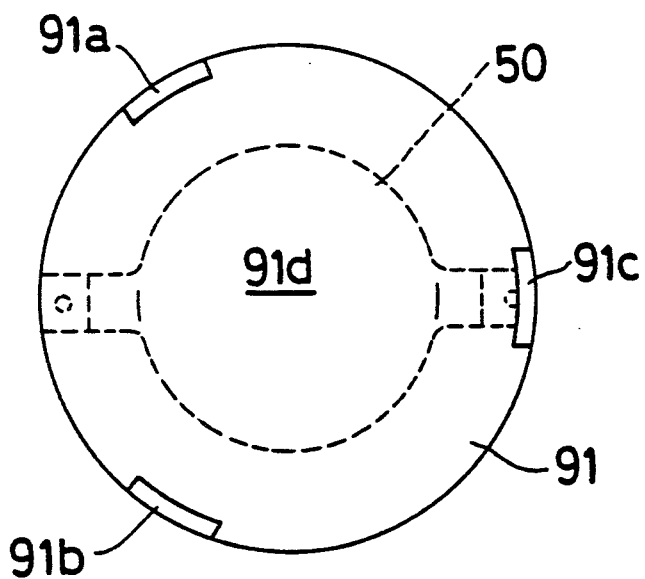

FIG. 26 is a bottom view of another disc-shaped spacer (91). The spacer (91) is adhered to the vibrator (50). The space (91) has three sector-shaped projections (91a), (91b) and (91c). The tops of the projections (91a), (91b) and (91c) are adhered to the mirror (11). A space (91d) is formed in the sector-shaped projection (91a), (91b) and (91c). The space (91d) is a separation corresponding to the space (36c) which makes the mirror (11) bend easily.

Figure 27:
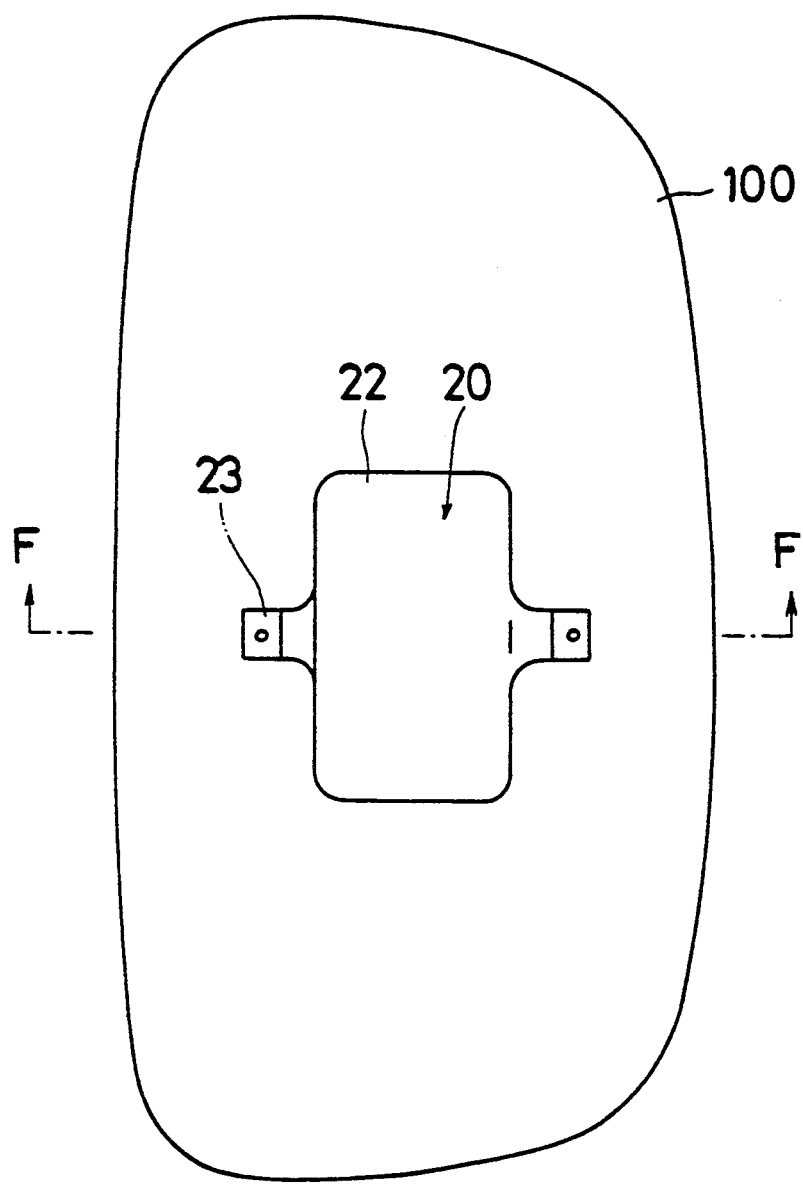
FIG. 27 is a plane view of an automotive rear view mirror relating to the present invention.
Figure 28:
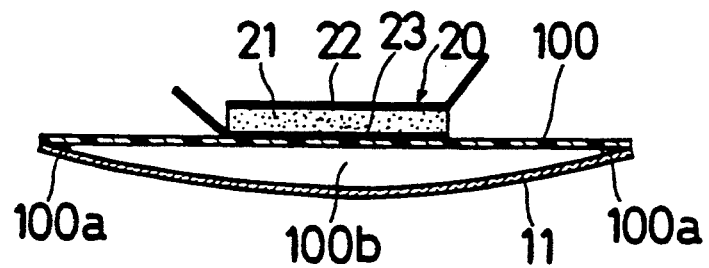
FIG. 28 is a cross sectional view along line F—F in FIG. 27.

A spacer (100) can be provided which is the same size as the mirror (11). FIGS. 27 and 28 show the fourth embodiment of this invention. Referring now to FIGS. 27 and 28, the fourth embodiment of this invention will be explained.

The spacer (100) is adhered to a convex mirror (11). The spacer (100) is made from glass epoxy plate. The spacer (100) is fixed to the outer circumference of the mirror (11) by an adhesive layer (100a). A space (100b) is formed in the adhesive layer (100a). The space (100b) is formed due to a curvature of the mirror (11). The space (100b) is a separation corresponding to the space (30a) which makes the mirror (11) bend easily.

Figure 29:
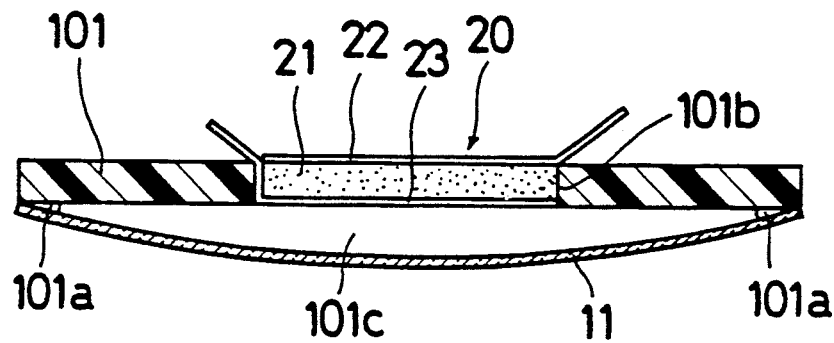
FIG. 29 is a cross sectional view along line F—F in FIG. 27.

The piezoelectric vibrator (20) can also be inserted in a spacer (101). FIG. 29 shows the fifth embodiment of this invention. The spacer (101) has almost the same thickness as the piezoelectric vibrator (20). The sapcer (101) has a through-hole (101b). The piezoelectric vibrator (20) is pressed into the through-hole (101b).

Figure 30A:
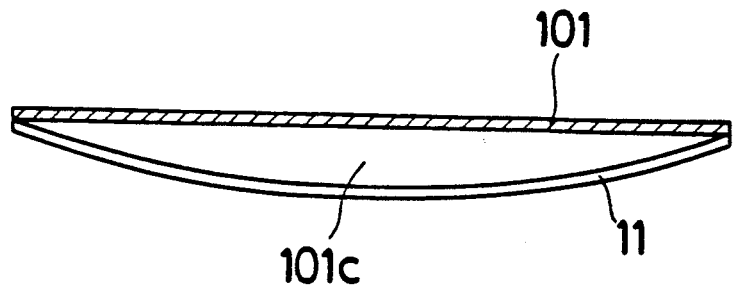
FIGS. 30a, 30b and 30c illustrate an oscillation of a mirror relating to the present invention.
Figure 30B:
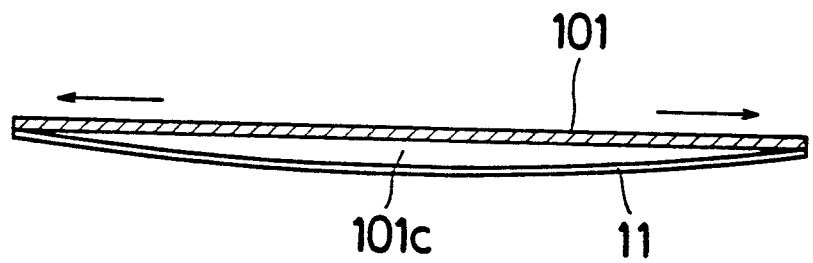
Figure 30C:
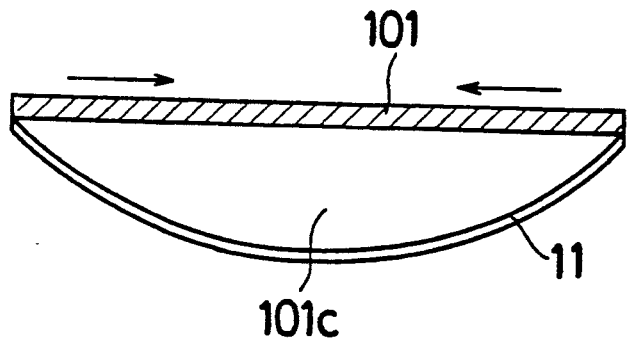

The oscillation process of the fifth embodiment is little different from the above embodiments. In the fifth embodiment, the spacer (101) expands and contracts due to expansion and contraction of the piezoelectric vibrator (20). In response to the expansion and contraction of the spacer (101), a vibration is generated on the mirror (11). Referring now to FIGS. 30a, 30b and 30c, an oscillation process of this embodiment will be explained.

FIG. 30a shows a neutral condition of the spacer (101). As shown in FIG. 30b, the spacer (101) can be expanded radially due to the expansion of the piezoelectric vibrator (20). At this time, the mirror (11) is somewhat flattened, and thus, the space (101c) becomes more narrow. Contrary to FIG. 30b, as shown in FIG. 30c, the spacer (101) can be contracted due to contraction of the piezoelectric vibrator (20). At this time, the mirror (11) is rounded, and thus, the space (101c) becomes more wide. Accordingly, a vibration is generated on the mirror (11) due to repeated the expansion and contraction of the spacer (34). As long as the frequency of the oscillating circuit (40) is determined properly, the mirror (11) is resonated and a standing wave is generated on the mirror (11). When the mirror (11) is resonated, water droplets and other foreign substances are atomized and drop from the mirror (11).

Figure 31:
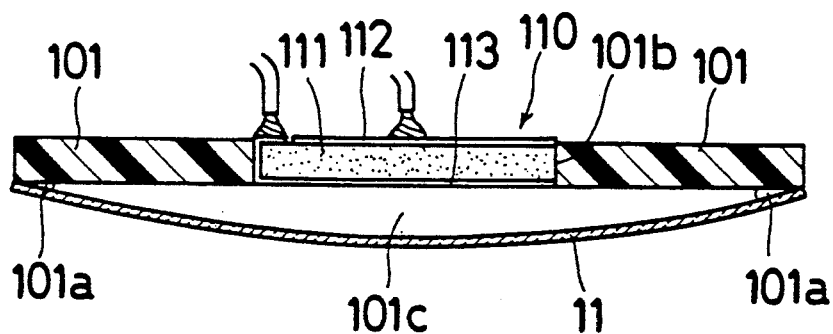
FIG. 31 is a cross sectional view along line F—F in FIG. 27.
Figure 32:
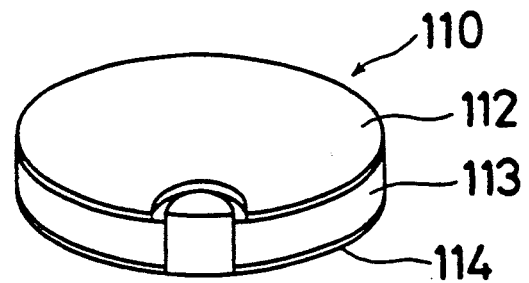
FIG. 32 is a perspective view of a piezoelectric vibrator relating to the present invention.

Referring to FIGS. 31 and 32, a modification of the fifth embodiment will be explained. In this embodiment, a piezoelectric vibrator (110) is pressed into the spacer (101). The piezoelectric vibrator (110) comprises a disc-shaped piezoelectric element (111) and two electrodes (112) and (113). The electrode (113) is extended toward the electrode (112) in order to connect a pair of conducting wires from one side.

Figure 33:
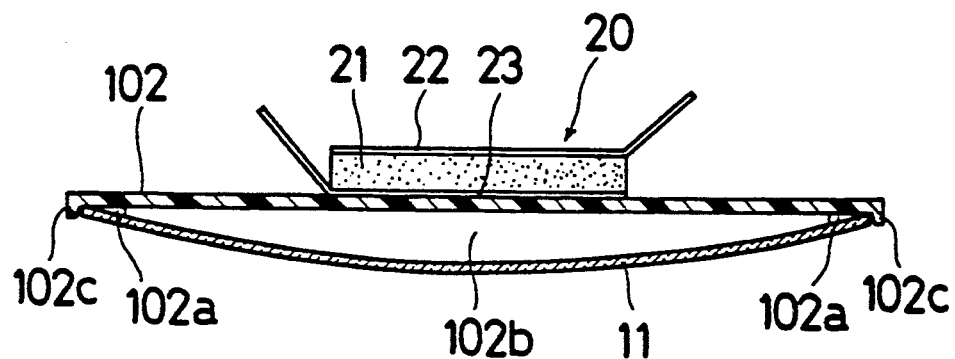
FIG. 33 is a cross sectional view along line F—F in FIG. 27.

Referring to FIG. 33, a modification of the fourth embodiment will be explained. A spacer (102) is utilized in this embodiment. The spacer (102) has a circular projection (102c) which is formed along an outer circumference of the spacer (102). A space (102b) is formed inside of an adhesive (102a). According to this embodiment, a section where the mirror (11) is cut off is covered by the circular projection (102c). Therefore, high grade images can be obtained, because the mirror (11) looks nice.

Figure 34:
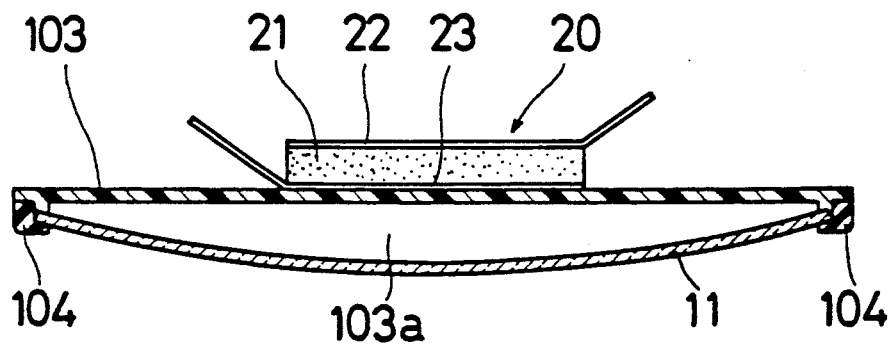
FIG. 34 is a cross sectional view along line F—F in FIG. 27.
Figure 35:
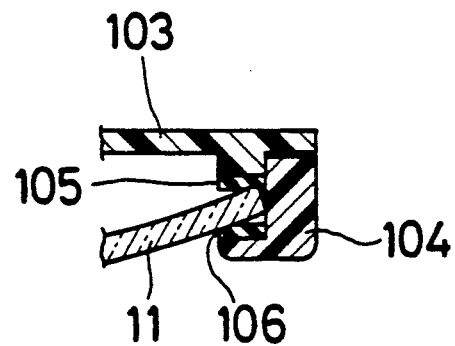
FIG. 35 is a enlarging cross sectional view of FIG. 34.

Referring now to FIGS. 34 and 35, another modification of the fourth embodiment will be explained. In this embodiment, a holder member (104) is deposited to a spacer (103) in order to cover the section where the mirror (11) is cut off. As shown in FIG. 35, a rubber member (105) is adhered to the spacer (103) and another rubber member (106) is adhered to the holder member (104). The mirror (11) is pinched between these rubber members (105) and (106). These rubber members (105) and (106) prevent dust and water from penetrating into space (103a) so that the vibrating character of the mirror (11) will remain relatively constant for a long time.

Referring now to FIGS. 36 and 37, a modification of the fifth embodiment will be explained.

A metal plate spacer (111) is adhered to the convex mirror (11). The spacer (111) comprises four finger portions (111a), (111b), (111c) and (111d). The ends of these finger portions (111a), (111b), (111c) and (111d) are adhered to the outer circumference of the mirror (11). A sinking portion (111e) is formed at almost the center of the spacer (111). The piezoelectric vibrator (20) is pressed into the sinking portion (111e) and adheres to the bottom of the sinking portion (111e).

As shown in FIG. 37, a space (112) is formed between the spacer (111) and the mirror (11). The space (112) is formed due to the curvature of the mirror (11) and also due to a projection of the finger portions (111a), (111b), (111c) and (111d). The space (112) is the separation corresponding to the space (36c) which makes the mirror (11) bend easily. In this embodiment, the space (112) is open to the atmosphere. Therefore, the vibration character of the mirror (11) can be maintained against the change of the temperature, because pressure is maintained in the space (112).

Referring now to FIGS. 38 and 39, another modification of the fourth embodiment will be explained.

A spacer (122) is supported by a mirror frame (121) through rivets (123), (124), (125) and screws (126), (127), (128). Rubber sleeves (129), (130), (131), (132), (133) and (134) are fitted to rivets (123), (124), (125) and screws (126), (127), (128). These sleeves (129), (130), (131), (132), (133) and (134) are inserted between the mirror frame (121) and the spacer (122) in order to support the spacer (122) for vibration.

The piezoelectric vibrator (20) is provided between the mirror frame (121) and the spacer (122). The piezoelectric vibrator (20) is adhered to a part of the spacer (122).

The mirror (11) is adhered to the outer circumference of the spacer (122). A spacer (136) is formed between the mirror (11) and the spacer (122). Further, a space (137) is formed between the mirror (11) and the mirror frame (121). The space (137) allows the mirror (11) to vibrate easily without interference of the mirror frame (121). A connecting portion (135) is formed on the mirror frame (121). A mirror controller (not shown) for adjusting the direction of the mirror (11) is connected to the connecting portion. Conducting wires (138) are fixed to the mirror frame (121) in order to supply electric power to the piezoelectric vibrator (20).

In this modification, the mirror (11) can oscillate freely without any interference from the mirror frame (121). Therefore, the mirror (11) can vibrate with a large amplitude of vibration. Further, the mirror (11) is supported by the spacer (122). Therefore, the outer circumference (121a) of the mirror frame (121) can be made thinner because the outer circumference (121a) need not support the mirror (11) any more. Thus, the molding distortion can be reduced from the outer circumference (121a) of the mirror frame (121) due to the thinner outer circumference (121a).

Further, the section where the mirror (11) is cut off is covered by the mirror frame (121). Therefore, high grade images can be obtained, because the mirror (11) looks nice.

Referring now to FIG. 40, further modification of the fourth embodiment will be explained.

A spacer (142) is supported by a mirror frame (141) through rivets (143) and (144). A rubber seat (145) is pinched between the mirror frame (141) and the spacer (142). The rubber seat (145) holds the spacer (142) but allows it to vibrate.

The piezoelectric vibrator (20) is adhered to a part of the spacer (142). A case (146) is adhered to the piezoelectric vibrator (20). The case (146) covers the piezoelectric vibrator (20). The mirror (11) is adhered to the outer circumference of the spacer (142). A space (143) is formed between the mirror (11) and the spacer (142). A circular projection (142a) is formed on the outer circumference of the spacer (142). A section where the mirror (11) is cut off is covered by the spacer (142). Therefore, high grade images can be obtained, because the mirror (11) looks nice.

A connecting portion (147) is formed. A mirror controller (not shown) for adjusting the direction of the mirror (11) is connected to the connecting portion (147).

Various modifications may be made in the invention described above without departing from the scope or spirit of the invention.

What is claimed is:

1. Cleaning apparatus for removing foreign substances from a generally planar member comprising:
    vibrator means for producing vibration to vibrate the generally planar member;
    spacer means for spacing the vibrator means from the planar member and for transferring the vibration of the vibrator means to the planar member, said spacer means being fixed to the generally planar member and being located between the generally planar member and the vibrator means, said spacer means defining an open space and said open space being positioned between the vibrator means and the generally planar member; and
    means for expanding and contracting the vibrator means in a radial direction with respect to a center of the vibrator means to vibrate the vibrator means.

2. An apparatus as claimed in claim (1), wherein the spacer means comprises a plurality of spacers located along the periphery of the vibrator means.

3. An apparatus as claimed in claim (1), wherein the outer periphery of the vibrator means substantially coincides with the outer periphery of the spacer means.

4. An apparatus as claimed in claim (1), wherein the outer periphery of the vibrator means is positioned radially inwardly from the outer periphery of the spacer means.

5. An apparatus as claimed in claim (1), wherein the outer periphery of the spacer means is positioned radially inwardly from the outer periphery of the generally planar member.

6. An apparatus as claimed in claim (1), wherein the outer periphery of the spacer means substantially coincides with the outer periphery of the generally planer member.

7. An apparatus as claimed in claim (1), wherein the vibrator means is positioned in a recessed portion formed in the spacer means.

8. An apparatus as claimed in claim 1, wherein the open space is in communication with the atmosphere.

9. An apparatus as claimed in claim 1, wheren the spacer means is fixed to the generally planar member along the periphery of the spacer means.

10. A method of removing foreign substances from a generally planar member comprising:
    providing a spacer means which has an open space and which is fixed to the generally planar member;
    providing a vibrating means fixed to the spacer means so that the spacer means is positioned between the vibrating means and the generally planar member and so that the open space is provided between the vibrating means and the generally planar member; and
    expanding and contracting the vibrating means to cause the vibrating means to vibrate and to cause the vibration of the vibrating means to be transferred to the generally planar member by way of the spacer means.

11. A method as claimed in claim 10, wherein the vibrating means vibrates the spacer means and the spacer means vibrates the generally planar member.

12. A method for removing foreign substances from a curved member comprising:
    providing a substantially flat spacer means attached to the edges of the curved member;
    providing a vibrator means within the flat spacer means and spaced from the curved member to define an open space between the vibrator means and the curved member; and
    changing the curvature of the curved member by vibrating the vibrator means contained within the spacer means.

13. An apparatus for removing foreign substances from a slightly curved member, comprising:
    a substantially flat spacer means fixed to the slightly curved member;
    a substantially flat vibrator means mounted on the spacer means for producing vibrations, said spacer means spacing the vibrator means from the slightly curved member;
    said spacer means being fixed to the slightly curved member to define an empty space between the substantially flat vibrator means and the slightly curved member; and
    means for vibrating the vibrator means.

14. An apparatus as claimed in claim 13, wherein said means for vibrating the vibrator means expands and contracts the vibrator means in a radial direction with respect to a center of the vibrator means.

15. Cleaning apparatus for removing foreign substances from a generally planar member comprising:
    vibrator means for vibrating the generally planar member;
    spacer means fixed to the generally planar member for spacing the vibrator means from the generally planar member, said spacer means having a through-hole extending therethrough, said vibrator means being positioned in the through-hole in the spacer means, said spacer means defining an open space between the vibrator means and the generally planar member;
    means for vibrating the vibrator means.

16. A method as claimed in claim 10, wherein the step of expanding and contracting the vibrating means includes expanding and contracting the vibrating means in a radial direction with respect to the center of the vibrating means.

17. An apparatus according to claim 1, wherein said spacer means includes a plurality of spaced apart projections, each of said spaced apart projections being secured to the generally planar member and the vibrator means.

18. A cleaning apparatus for removing foreign substances from a generally planar member comprising:

vibrator means for producing vibration to vibrate the generally planar member;

spacer means for spacing the vibrator means from the generally planar member and for transferring vibration of the vibrator means to the planar member, said spacer means being mounted on the vibrator means and the generally planar member, and said spacer means including a depressed region that is spaced from the generally planar member; and means for expanding and contracting the vibrator means to vibrate the vibrator means and thereby cause vibration in the generally planar member.

* * * * *